US012578565B2

(12) United States Patent
Mevada et al.

(10) Patent No.: US 12,578,565 B2
(45) Date of Patent: Mar. 17, 2026

(54) COMPACT PORTABLE MULTIMODAL MICROSCOPY

(71) Applicant: ATRIVIOM PRIVATE LIMITED, Deesa (IN)

(72) Inventors: Jayeshkumar Sevantilal Mevada, Gujarat (IN); Aniruddha Bhalchandra Pandit, Maharashtra Mumbai (IN)

(73) Assignee: ATRIVIOM PRIVATE LIMITED, Deesa (IN)

( * ) Notice: Subject to any disclaimer, the term of this patent is extended or adjusted under 35 U.S.C. 154(b) by 378 days.

(21) Appl. No.: 18/270,698

(22) PCT Filed: Jan. 5, 2022

(86) PCT No.: PCT/IN2022/050010
§ 371 (c)(1),
(2) Date: Jun. 30, 2023

(87) PCT Pub. No.: WO2022/149162
PCT Pub. Date: Jul. 14, 2022

(65) Prior Publication Data
US 2024/0069315 A1 Feb. 29, 2024

(30) Foreign Application Priority Data
Jan. 6, 2021 (IN) ............................ 202121000533

(51) Int. Cl.
*G02B 21/00* (2006.01)
*G02B 21/06* (2006.01)
*G02B 21/24* (2006.01)

(52) U.S. Cl.
CPC ......... *G02B 21/0008* (2013.01); *G02B 21/06* (2013.01); *G02B 21/24* (2013.01)

(58) Field of Classification Search
CPC ........ G02B 21/0008; G02B 21/02–025; G02B 21/06–14; G02B 21/24; G02B 21/241; G02B 21/248; G02B 21/26
See application file for complete search history.

(56) References Cited

U.S. PATENT DOCUMENTS 4,095,874 A 6/1978 Wallace
5,062,697 A 11/1991 Mitchell
(Continued)

FOREIGN PATENT DOCUMENTS

CN 103257436 A 8/2013
CN 103558676 A 2/2014
(Continued)

OTHER PUBLICATIONS

Flusberg et al., "Fiber-optic fluorescence imaging," *Nat. Methods* 2(12):941-950, Dec. 2005. (NIH Public Access Author Manuscipt, available in PMC Apr. 5, 2010) (21 pages). DOI: 10.1038/nmeth820.
(Continued)

*Primary Examiner* — Nicholas R. Pasko
(74) *Attorney, Agent, or Firm* — Seed Intellectual Property Law Group LLP

(57) ABSTRACT

The disclosure herein describes a compact portable multimodal microscopy apparatus comprising an optical microscopy unit including one or more microscopy modules, wherein each microscopy module comprises an optical lens assembly with eight to sixteen lens elements having a total magnification in a range of 10× to 2000×; a protective layer disposed on the optical microscopy unit to protect the optical microscopy unit from physical and chemical damages; a sample holding unit disposed on the protective layer, wherein the sample holding unit includes at least one compartment to hold a sample to be imaged by the one or more microscopy modules; a first light source unit mounted
(Continued)

on the optical microscopy unit; and a second light source unit mounted inside the optical microscopy unit adjacent to the one or more microscopy modules.

25 Claims, 14 Drawing Sheets

(56) References Cited

U.S. PATENT DOCUMENTS

| | | | |
|---|---|---|---|
| 6,847,480 B2 | 1/2005 | Steenblik et al. | |
| 7,023,614 B2 | 4/2006 | Gilbert | |
| 7,139,415 B2 * | 11/2006 | Finkbeiner | G02B 21/367 |
| | | | 250/201.3 |
| 2015/0103413 A1 | 4/2015 | Uchida et al. | |
| 2015/0278625 A1 * | 10/2015 | Finkbeiner | G01N 21/253 |
| | | | 348/79 |
| 2016/0004057 A1 | 1/2016 | Lin et al. | |
| 2016/0266362 A1 | 9/2016 | Kapanidis et al. | |
| 2016/0282592 A1 | 9/2016 | Abe et al. | |
| 2017/0090173 A1 * | 3/2017 | Kitahara | G02B 5/005 |
| 2017/0199364 A1 * | 7/2017 | Doric | G02B 21/0008 |
| 2018/0172968 A1 | 6/2018 | Tsai | |
| 2019/0219808 A1 * | 7/2019 | Takahashi | C12M 1/34 |
| 2019/0243115 A1 | 8/2019 | Hara et al. | |
| 2019/0323944 A1 | 10/2019 | Glensbjerg et al. | |
| 2019/0324243 A1 | 10/2019 | Abe | |

FOREIGN PATENT DOCUMENTS

| | | | |
|---|---|---|---|
| CN | 109856789 A | 6/2019 |
| DE | 102014215100 A1 | 2/2016 |
| JP | 2000249927 A | 9/2000 |
| JP | 2005128378 A | 5/2005 |
| JP | 2009294518 A | 12/2009 |
| JP | 2011013661 A | 1/2011 |
| JP | 2011048017 A | 3/2011 |
| JP | 2019139025 A | 8/2019 |
| JP | 2019191273 A | 10/2019 |
| WO | WO 2007115948 A1 | 10/2007 |
| WO | WO 2013120091 A1 | 8/2013 |
| WO | 2014046126 A1 | 3/2014 |
| WO | 2015087619 A1 | 6/2015 |
| WO | WO 2018148471 A2 | 8/2018 |
| WO | WO 2019032824 A1 | 2/2019 |

OTHER PUBLICATIONS

Smith et al., "Portable, miniaturized, fibre delivered, multimodal CARS exoscope," *Optics Express* 21(14):17161-17175, Jul. 15, 2013. DOI: 10.1364/OE.21.017161.

* cited by examiner

100

1

2

3

4

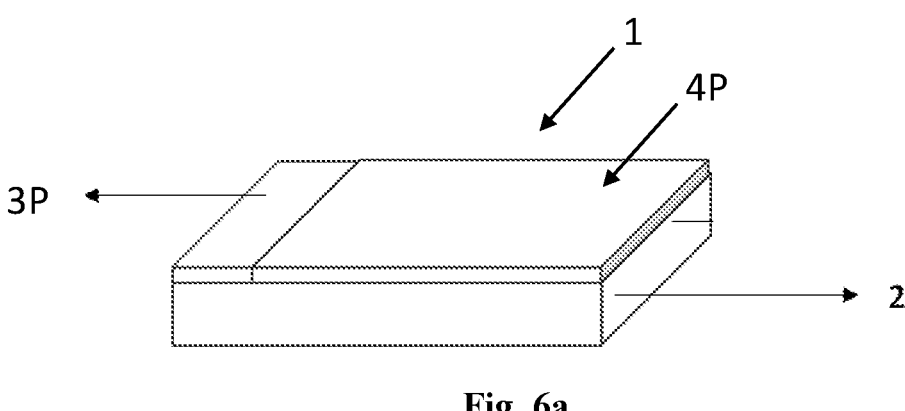
Fig. 6a
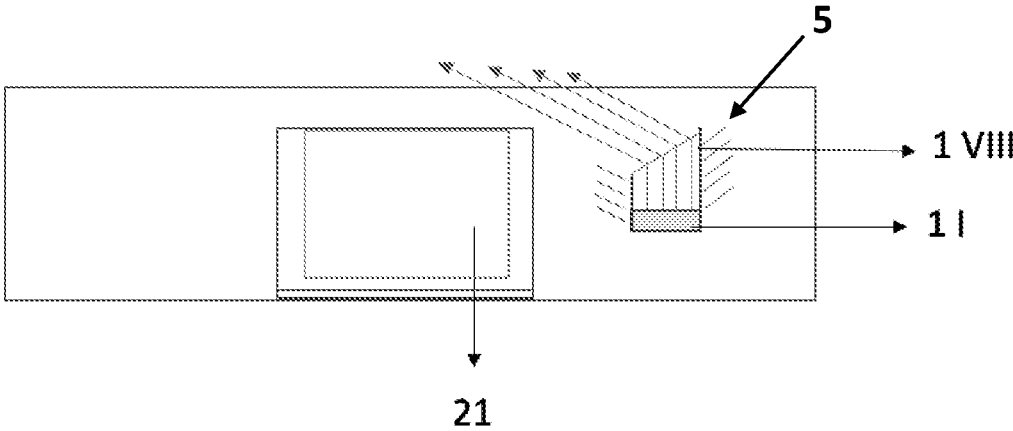
Fig. 6b
Fig. 7

35

21

2

33

44

21

42

35

43

74

4

75

72          71

74

75

4

71

74

75

71

4

74

75

71

4

COMPACT PORTABLE MULTIMODAL MICROSCOPY

BACKGROUND

Technical Field

The present disclosure relates to an apparatus and method for enabling enlarged view of a specimen. More specifically, it relates to a compact multimodal portable microscope that has different mode of microscopic features including variable field of view, magnification, and resolution in one compact and portable device as per the required applications.

Description of the Related Art

Microscope is the essential instrument for the wide range of application such as education, research and diagnostic applications. Microscopes are used for viewing the world at the microscopic level which is invisible to human naked eyes. Microscopes have come a long way from simple magnifying lenses to current advance complex systems having multiple lenses. There is various type of the microscope includes such as light field microscopy, dark field microscopy, electron microscope and florescence microscope has been widely explored for the wide range of applications.

The portable or hand-held microscope research has seen considerable improvements since the last two decades. Following are the prior art for the proposed device is reported and briefly described.

US20160004057 describes a portable microscopic device that is devised where a smartphone is used for capturing images and where magnification depends on the microscopic lens. In said application two polarization films are used for adjusting the quantity of light entering from illumination source to image capturing device, camera of a smart phone.

U.S. Pat. No. 7,023,614 describes a portable microscope with an illumination module. The main objective of the mentioned disclosure is to provide a cheap artificial light source and also to use the minimum number of elements (hardware) for microscope stand.

U.S. Pat. No. 6,847,480 describes a single lens microscope with unique focusing and slide holding mechanism.

Another patent, U.S. Pat. No. 5,062,697, have set forth the portable microscope apparatus with a unique feature of comparing abnormal blood samples with normal blood samples at the same time.

U.S. Pat. No. 4,095,874 describes a hand-held microscope where a hand deflection is used for focusing. This microscope lacks flexibility in terms of lens holding and fine adjustment.

WO2013120091 discloses an optical device (Foldscope) made up of flat sheets. The disadvantage is spherical abrasion as spherical lenses, low resolution and lower the field of view and it is not used for the Therefore, from above-described prior art there is a need to develop a cost-effective microscope with multimodal like all variable magnification, resolution and field of view in one compact device without bulky arrangement, digitally auto-focusing or easy to focusing and single or continuous sample holding assembly with manually or digitally controlled automated controlled movement of slide for its scanning purpose in one compact portable assembly is elusive. The present disclosure addresses these issues very comprehensively and put the disclosure described/specified in the patent application.

BRIEF SUMMARY

Main object of the present disclosure is to develop a compact and portable multimodal microscope.

Another object of the present disclosure is to develop a multimodal compact microscope assembly that can be used for variable magnification, resolution, field of view, etc., in one compact device without bulky and complex assembly, wherein the mode can change by automated or manually or digitally controlled through any of the digital device.

Yet another object of the present disclosure is to develop a multimodal compact microscopy which is user friendly and compact arrangement for the manually or automated controlling or digitally driven controlled focusing of object using any of the digital device.

Yet still another object of the present disclosure is to provide a sample holding arrangement for single use or multiple use or continuous sampling or an arrangement for dark field or filter field arrangement wherein sample holding platform having a manual or automated or digitally controlled automated movement in horizontal plane.

Yet still further object of the present disclosure is to provide a portable and adjustable light source arrangement with multiple features such as adjustable with respect to microscopic assembly, arrangement for multiple features such dark field, filter field and intensity controlled as per required application.

Yet still further object of the present disclosure is to provide a cost effective and user-friendly in compact assembly with easy to operate in all modes through the any of the digital device.

BRIEF DESCRIPTION OF THE SEVERAL VIEWS OF THE DRAWINGS

FIG. 6a and FIG. 6b show the optical microscopy unit with a foldable first light source unit in the off mode and the use mode, respectively, in an example.

FIG. 7 shows the optical microscopy unit with the second light source unit, in an example.

FIG. 12b shows a top view of the sample holding unit of FIG. 12a.

DETAILED DESCRIPTION

In the present disclosure, different terms are used for describing the disclosure. The definitions of terms are as follows.

The terms 'apparatus,' 'assembly,' 'device,' 'system' can be used interchangeably in the given specification.

The term 'multimodal' used herein refers to the multiple modes of microscopic features such as a light field with a variable resolution, a field of view, magnification, filter field and dark field microscopy in one compact assembly.

The present disclosure discloses compact portable multimodal microscopy apparatuses for various applications, such as, but not limited to, the education, research, and diagnosis application, etc.

Figure 1:
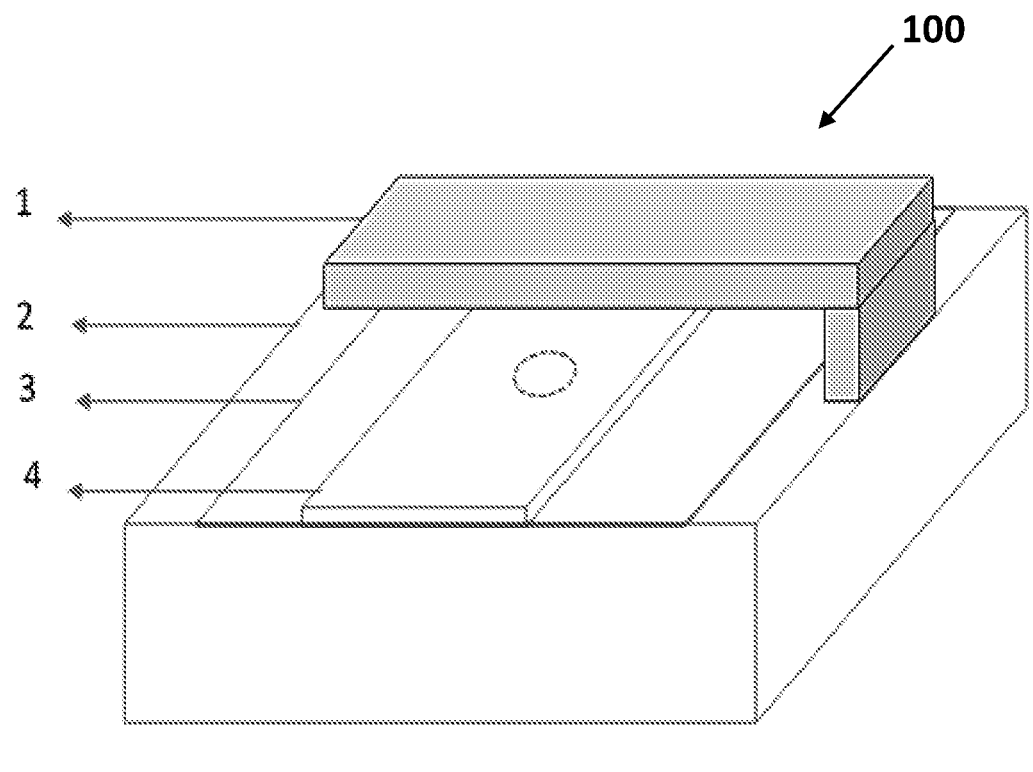
FIG. 1 shows a compact portable multimodal microscopy apparatus, according to an example.

In accordance with an example of the present subject matter, a compact portable multimodal microscopy apparatus comprises:

1. an optical microscopy unit (2 in FIG. 1)
  2. a protective layer (3 in FIG. 1)

3. a sample holding unit (4 in FIG. 1)
  4. a first light source unit (external light source unit) (1 in FIG. 1)
  5. a second light source unit (internal light source unit) (5 in FIG. 7)

The optical microscopy unit comprises one or more microscopy modules for the light field, dark field and filter field microscopy. The optical microscopy unit also includes a focusing platform, wherein the focusing platform comprises an arrangement for digitally and automatically controlling focusing of one or more microscopy modules. The focusing platform may be a common platform for multiple microscopy modules or may be a single platform for multiple microscopy modules.

The optical microscopy unit also includes electronics components, wherein the electronics components comprise components for energy storage, data storage, data processing and data transfer, energy transfer, etc., wherein the data processing and transferring unit can be used for controlling the entire compact portable multimodal microscopy apparatus digitally or through AI or machine learning.

The protective layer is used for protection of the optical microscopy unit or the one or more microscopy modules thereof from any kind of physical and chemical damages. The protective layer may be with or without wavelength-specific characteristics and it eliminates the cleaning of the apparatus. The protective layer can be for a single-use or a multiple-use protective layer.

The sample holding unit includes a single compartment or multiple compartments for holding a same or different samples for imaging using the microscopy module(s). The sample holding unit may be a single-use or a multiple-use sample holding unit. The sample holding unit may have a continuous sample imaging arrangement and/or a microfluidic sample imaging arrangement. The sample holding unit may be with or without a wavelength-specific filter for observing samples. The sample holding unit may be configured to move in a plane parallel to the sample holding unit. The movement of the sample holding unit may be manual or automated. The movement of the sample holding unit may be digitally controlled through any digital device, such as a smartphone, a computer, etc.

The first light source unit is an external light source unit. The first light source unit is mounted on the optical microscopy unit to provide light to the sample in the sample holding unit from outside of the optical microscopy unit. The first light source unit may be a fixed or a foldable or a detachable or an adjustable light source unit. The first light source unit may be a diffused light source unit or a point light source unit, or a combination thereof.

The second light source unit is an internal light source unit. The second light source unit is located in optical microscopy unit for the filter field, fluorescence or dark field microscopy.

In an example, the compact portable multimodal microscopy apparatus comprises a light emitting diode disposed at a peripheral surface of the sample holding unit to provide light rays to the sample in the sample holding unit.

FIG. 1 shows a compact portable multimodal microscopy apparatus 100, in an example. The compact portable multimodal microscopy apparatus 100 hereinafter may be interchangeably referred to as the apparatus 100. The apparatus 100 is configured to operate any one of or a combination of two or more than two modes, such as a variable resolution mode, a variable field of view mode, and a variable magnification mode. The apparatus 100 is configured to operate in a light field microscopy mode, a dark field microscopy mode, a filter field microscopy mode, a fluorescence field microscopy mode, or a combination thereof.

The apparatus 100 comprises an optical microscopy unit 2, a protective layer 3, a sample holding unit 4, a first light source unit 1, and a second light source unit 5 (shown in FIG. 7). The components of the apparatus 100 are described in detail in the description hereinafter.

The optical microscopy unit 2 comprises one or more than one microscopy modules. Each microscopy module of the optical microscopy unit 2 comprises an optical lens assembly (not shown) with eight to sixteen lens elements having a total magnification in a range of 10× to 2000× for the light field, dark field and filter field microscopies and with variable resolution, numerical aperture, depth of field magnification, and field of view, etc. The details of the optical lens assembly with eight to sixteen lens elements are described later in the description.

Figure 2A:
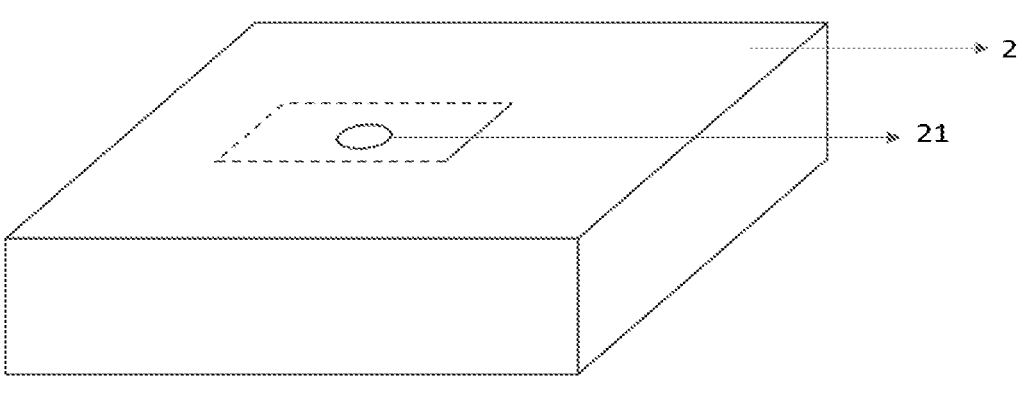
FIG. 2a illustrates an optical microscopy unit with a single microscopy module, in an example.
Figure 2B:
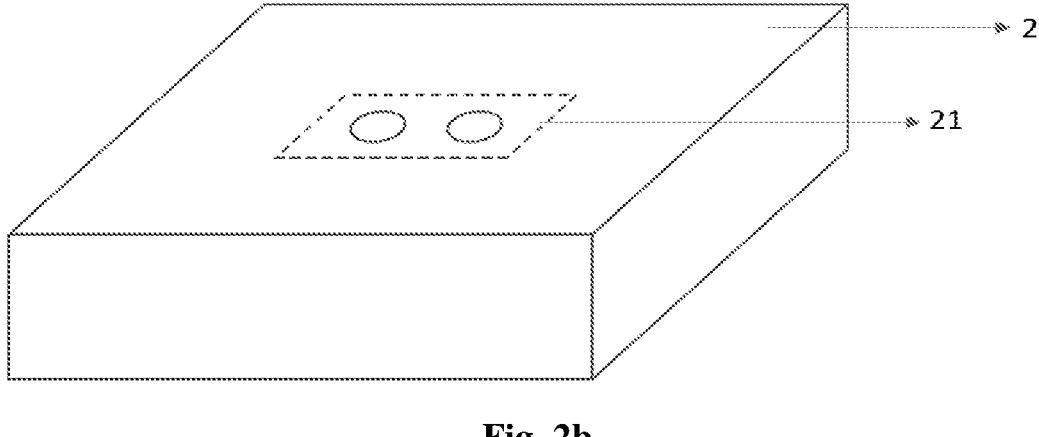
FIG. 2b shows an optical microscopy unit with two microscopy modules, in an example.
Figure 2C:
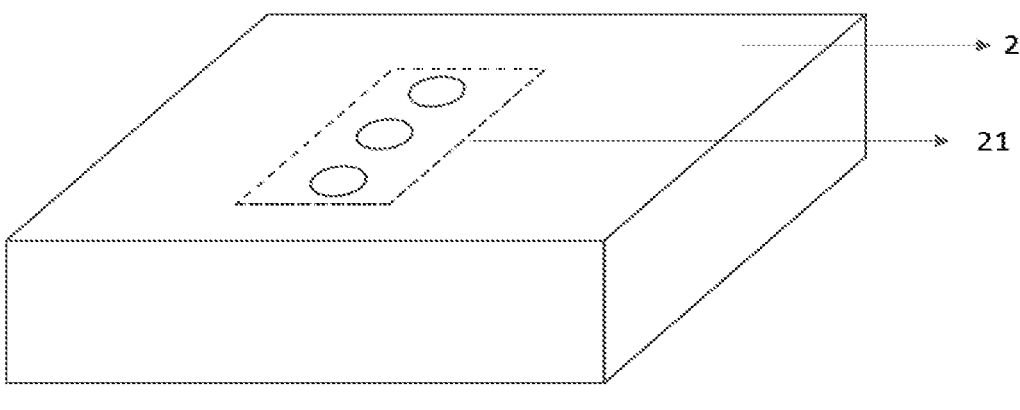
FIG. 2c shows an optical microscopy unit with three microscopy modules, in an example.

FIG. 2a illustrates an optical microscopy unit 2 with a single microscopy module 21, in an example. FIG. 2b shows an optical microscopy unit 2 with two microscopy modules 21, in an example. FIG. 2c shows an optical microscopy unit 2 with three microscopy modules 21, in an example. In an example, the optical microscopy unit 2 may include four or more microscopy modules.

The arrangement of the single or multiple microscopy modules 21 can be in any geometric pattern, including, but not limited to, a square pattern, a triangular pattern, or a linear pattern, or a hexagonal pattern, or any other geometric pattern.

The microscopy module(s) may be mounted on a fixed or movable platform. In an example, a single microscopy module or multiple microscopy modules are fixed on a platform or are mounted on a rotating part having a rotational movement about its axis for the changing of microscopic module automatically or manually as per the required application. The changing of the mode of microscopy is possible through a digital controlled automated device, such as a smartphone, a tablet, a computer, or any of such digital device through a computer-implemented method or a mobile application which makes the apparatus 100 more user-friendly as compared to the conventional bulky system for microscopy. The observation of the sample with variable microscopy features can be directly controlled through any of the digital devices makes the apparatus 100 more user friendly and compact as compared to the complex and manually operated bulky arrangement for a different mode of variable magnification in the conventional system as per the required application of 10×, 40× and 100×. The multiple modules for a different microscopy feature in a single compact arrangement give the advantage of viewing or imaging the sample with variable microscopy features in a compact assembly as compared to the different bulky arrangements or separate systems required for different features in conventional microscopy.

Figure 2D:
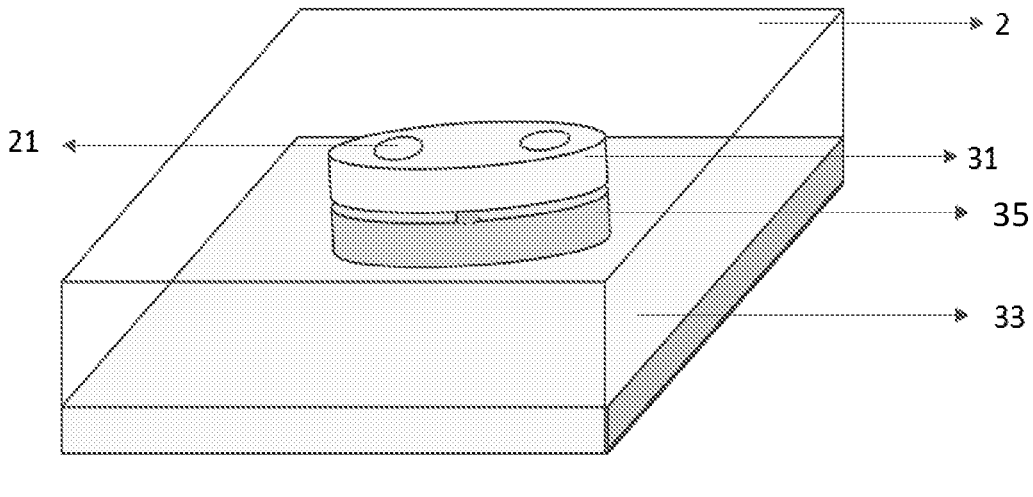
FIG. 2d shows an optical microscopy unit with two microscopy modules in a rotatable unit, on a focusing unit, and with electronic components, in an example.

FIG. 2d shows an optical microscopy unit 2 with two microscopy modules 21 in a rotatable unit 31, on a focusing platform 35, and with electronic components 33, in an example. The electronic components 33 may include, but are not limited to, a printed circuit board (PCB), a battery, a data transferring component USB port, a Bluetooth port, and a Wi-Fi port. The rotational axial movement of the rotating unit 31 and the operating of the focusing platform 35 is used as per the required magnification, resolution, field of view, etc. The rotating unit 31 is mounted on the focusing platform 35. The movement of the rotating part 31 is controlled by manually or automatically or digitally controlled movement through a user interface or a digital device (not shown)

coupled with the apparatus 100. In an example, the rotating part 31 is moved by an electrical motor. The rotational movement of the motor is directly controlled by a digital device. The focusing platform 35 is described in detail later in the description.

Each microscopy module 21 comprises an optical lens assembly with multiple optical elements (not shown), such as optical lens, and an image capturing assembly (not shown) for microscopy functionality, such as, but not limited to, variable numerical aperture, resolution, field of view, depth of field, and magnification. The details of the lens elements in the optical lens assembly are described later in the description. The image capturing assembly may be an image sensor (CMOS, CCD) or any image capturing sensor or camera module or digital image capturing assembly. The image capturing sensor may be a CCD sensor or a CMOS sensor with a pixel size in the range from 0.6 microns to 6 microns and a pixel density from 0.1 Maga pixel to 600 Megapixel. The optical elements may comprise in the range from eight lens elements to sixteen lens elements for the variable resolution, field of view, magnification, depth of field, with or without light-guiding element for fluorescence or filter field microscopy. The wavelength-specific filter element can allow passing the desired wavelength of the light as per the required application. The wavelength-specific filter element may be located between any of the optical elements or between optical element and sensor, or between the sample to be imaged and an optical element. The wavelength-specific filter element comprises gelatin, glass or dichroic or any wavelength-specific polymeric film or composite which can allow a specific wavelength of light to pass through. This can be used for specific analytical applications where the desired wavelength of light is essential to characterize the sample or to see the feature of the sample in a specific wavelength of light.

The first light source unit 1 is mounted on the optical microscopy unit 2, where the first light source unit 1 is to provide light to the sample in the sample holding unit 4 from outside of the optical microscopy unit 2. The first light source unit 1 is an external light source unit for light field microscopy.

The first light source unit 1 may be an adjustable light source unit or a fixed light source unit or a detachable light source unit or a foldable light source unit.

In an example, the first light source unit 1 is movable relative to the optical microscopy unit 2 to vary a distance between a top surface of the sample holding unit 4 and a bottom surface of the first light source unit 1.

Figure 3A:
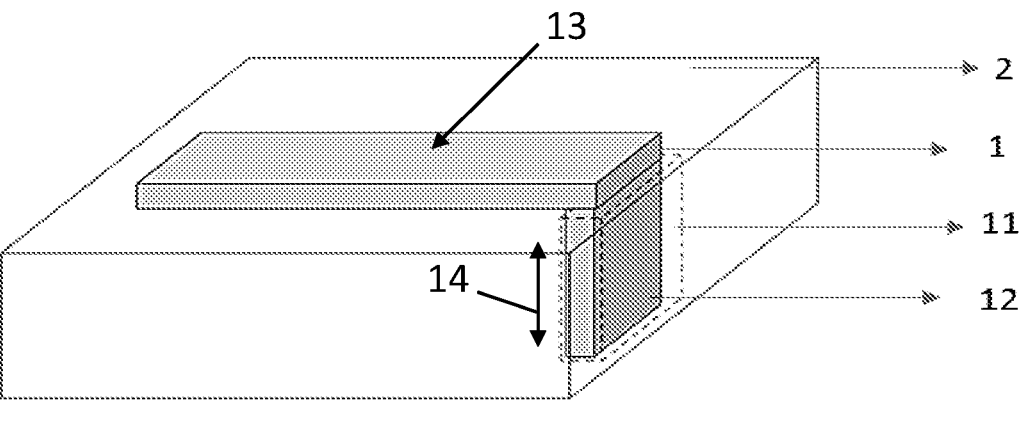
FIG. 3a shows a compact portable multimodal microscopy apparatus having a first light source unit with an adjustable mechanism, in an example.

FIG. 3a shows a compact portable multimodal microscopy apparatus 100 having a first light source unit 1 with an adjustable mechanism, in an example. As shown, the first light source unit 1 has a first part 12 movable relative to the optical microscopy unit 2 to vary a distance between a top surface of the sample holding unit 4 and a bottom surface of the first light source unit 1 and has a second part 13 coupled to the first part 12, where the second part 13 include at least a light source. The first part 12 is placed in a housing 11 of the optical microscopy unit 2. The first part 12 is movable in the housing 11 in a direction 14 as shown in FIG. 3a. The movement of the first part 12 may be performed manually or automatically using a digital device. The movement may be controlled through an electrical motor or a gear system or an adjustable screw-based system.

In an example, the second part 13 is magnetically coupled with the first part 12. In an example, the second part 13 is foldable about the first part 12.

Further, in an example, the first light source unit 1 is a point light source or a diffuse light source or a combination thereof, and is detachably mounted on the optical microscopy unit 2. The type and combination of the first light source unit 1 is as per the required application of variable resolution, magnification, and field of view. The first light source unit 1 has at least one of variable intensity of light, variable wavelength of light, and variable area of light exposure on the sample in the sample holding 4. The intensity of light, wavelength of light, and area of light exposure may be controller manually or through a digital device.

The first light source unit 1 includes at least one light emitting diode (LED) of a single wavelength or of different wavelengths with an optical element and/or a diffusor and/or a light directing element. In an example, the LED may be a white LED. The switching of the LED, the intensity of light, area of exposure on samples, the wavelength of the light, the distance of the first light source unit 1 from the sample in the sample holding unit 4 can be controlled through manually or through a digital device as per the requirement of applications and the microscopy module.

Figure 3B:
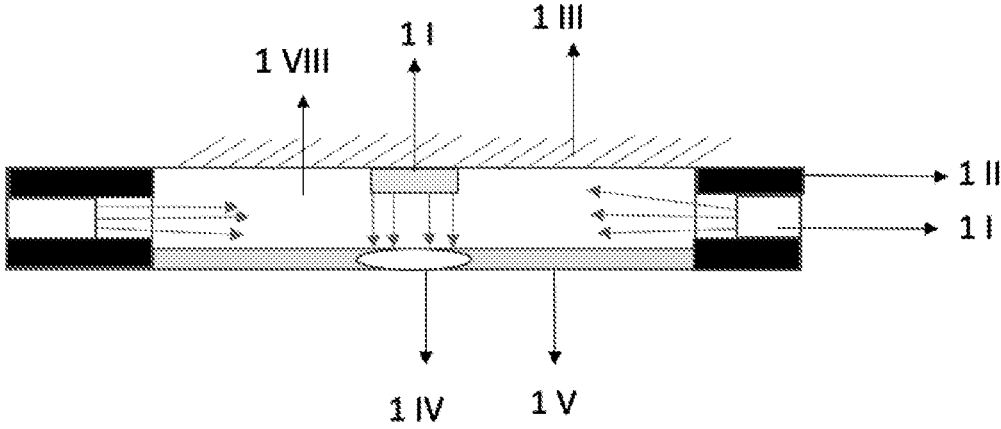
FIG. 3b shows a side view of the first light source unit with a dual light emitting diodes arrangement, in an example.

FIG. 3b shows a side view of the first light source unit 1 with a dual light emitting diodes arrangement, in an example. As shown, the first light source unit 1 has a light directing element 1VIII with a reflective top surface 1III from outside; a light emitting diode (LED) 1I placed inside and proximal to the reflective top surface 1III of the light directing element 1VIII; a diffuser 1V coupled to a bottom surface of the light directing element 1VIII; and a convex lens 1IV or a plano-convex lens 1IV placed in the diffuser 1V. The LED 1I and the convex lens or the plano-convex lens are in-line with respect to each other in a manner that light rays emitted by the LED 1I are directly directed towards the convex lens or the plano-convex lens and further onto the sample holding unit 4. The above described configuration of the first light source unit 1 with the LED 1I provides more coherent light rays which help in higher resolution image capturing without aberrations. Said configuration with the LED 1I is used for the higher magnification above the total magnification of 200× and the distance between the sample holding unit 4 and the first light source unit 1 is varied from 1 mm to 10 mm.

The first light source unit 1 further comprises at least one LED placed on a side surface of the light directing element 1VIII. As shown in FIG. 3b, the first light source unit 1 has two LEDs 1I on the side surface of the light directing element 1VIII. The peripheral surfaces 1II of the LED(s) placed on the side surface of the light directing element 1VIII are made of an opaque material for concentrating the light towards the light directing element 1VIII only without spreading the light. Light rays emitted by the LED(s) placed on the side surface of the light directing element 1VIII are reflected from the reflective top surface 1III of the light directing element 1VIII and uniformly diffused through the diffuser 1V onto the convex lens or the plano-convex lens and further onto the sample holding unit 4. The LED(s) placed on the side surface of the light directing element 1VIII provide diffused light from the first light source unit 1.

The light directing element 1VIII has a high refractive index (>1) and is made up of polymer or plastic or glass or composite materials. The LEDs that provide diffused light is used for the wide field of view (>1 mm²), low magnification (<300×), and resolution (>10 microns). The diffuser 1V may be in a square shape, a ring shape, a hexagonal shape or a circular shape, or any other shape. The diffuser 1V has a thickness from 0.1 mm to 8 mm. It may be in white or color, and made of plastic, coated glass or polymer or composite materials, or a combination thereof. The LED(s) placed on the side surface of the light directing element 1VIII is used up to 300× magnification and the distance between the sample holding unit 4 and the first light source unit 1 is varied from 5 mm to 35 mm. The dual diffuse and point light source provides a wide range of image capturing characteristics such as variable resolution, magnification, a field of view in a single compact arrangement.

Figure 3C:
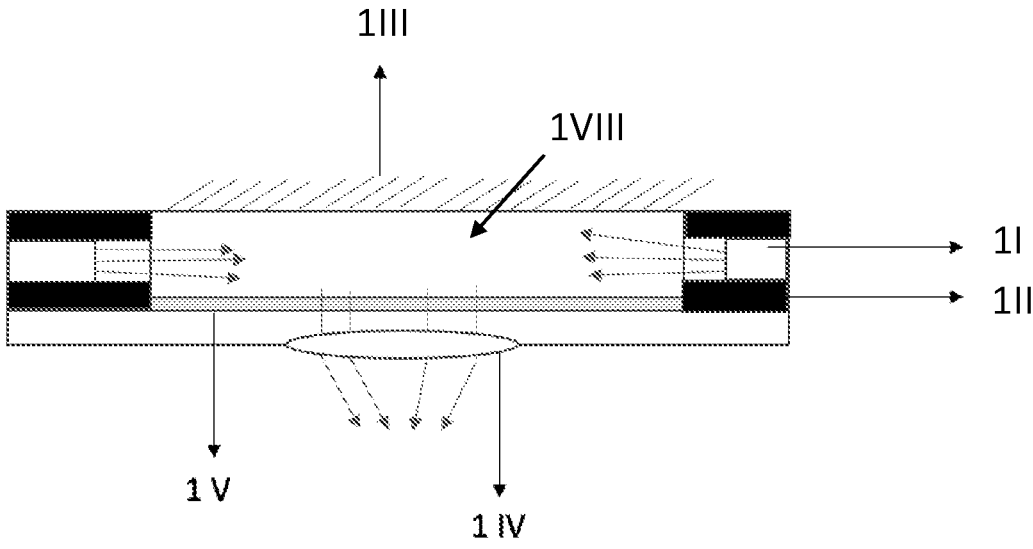
FIG. 3c shows a side view of the first light source unit, in an example.

In an example, the first light source unit 1 is a diffuse light source unit. FIG. 3c shows a side view of the first light source unit 1 as a diffuse light source unit, in an example. As shown, the first light source unit 1 has a light directing element 1VIII with a reflective top surface 1III from outside; one or more LEDs 1I placed on a side surface of the light directing element 1VIII, where peripheral surfaces 1II of the LED(s) are made of an opaque material; a diffuser 1V coupled to a bottom surface of the light directing element 1VIII; and a convex lens 1IV or a plano-convex lens 1IV placed proximal to the diffuser 1V. Light rays emitted by the LEDs placed on the side surface of the light directing element 1VIII are reflected from the reflective top surface 1III of the light directing element 1VIII and diffused through the diffuser 1V onto the convex lens or the plano-convex lens and further onto the sample holding unit 4. The diffuse light source unit 1 with the lens element provides high-quality image capturing with minimal aberration up to 400× magnification.

Figure 3D:
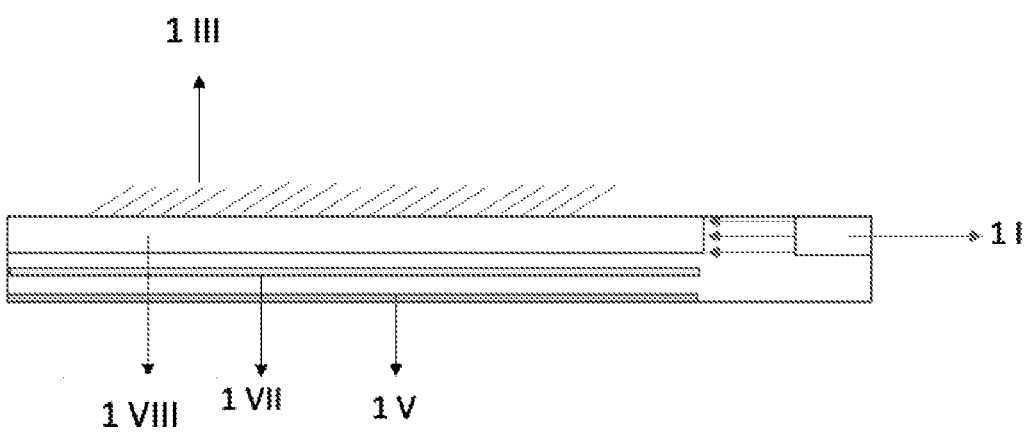
FIG. 3d. shows a side view of the first light source unit, in an example.

FIG. 3d shows a side view of the first light source unit 1 as a diffuse light source unit, in another example. As shown, the first light source unit 1 has a light directing element 1VIII with a reflective top surface 1III from outside; an LED 1I placed adjacent to a side surface of the light directing element 1VIII; a light guiding element 1VII adjacent to a bottom surface of the light directing element 1VIII; and a diffuser 1V adjacent to a bottom surface of the light guiding element 1VII. Light rays emitted by the LED 1I are reflected from the reflective top surface 1III of the light directing element 1VIII, passed through the light guiding element 1VII, and diffused through the diffuser 1V onto the sample holding unit 4.

The light guiding element 1VII is a specific filter that allows the specific light rays at a different angle from 30 to 120 degrees to pass through and prevents passage of any unwanted light responsible for the aberrations. The diffuser 1V may be in a square shape, a ring shape, a hexagonal shape or a circular shape, or any other shape. The diffuser 1V has a thickness from 0.1 mm to 8 microscopy module and may be in white or color and made up of plastic, coated glass or polymer or composite materials, or a combination thereof. The light guiding element 1VII improves the image capturing quality with uniform light rays coming from the LED 1I which can further reduce the aberrations. The first light source unit of FIG. 3d is used for up to 500× magnification.

Figure 4A:
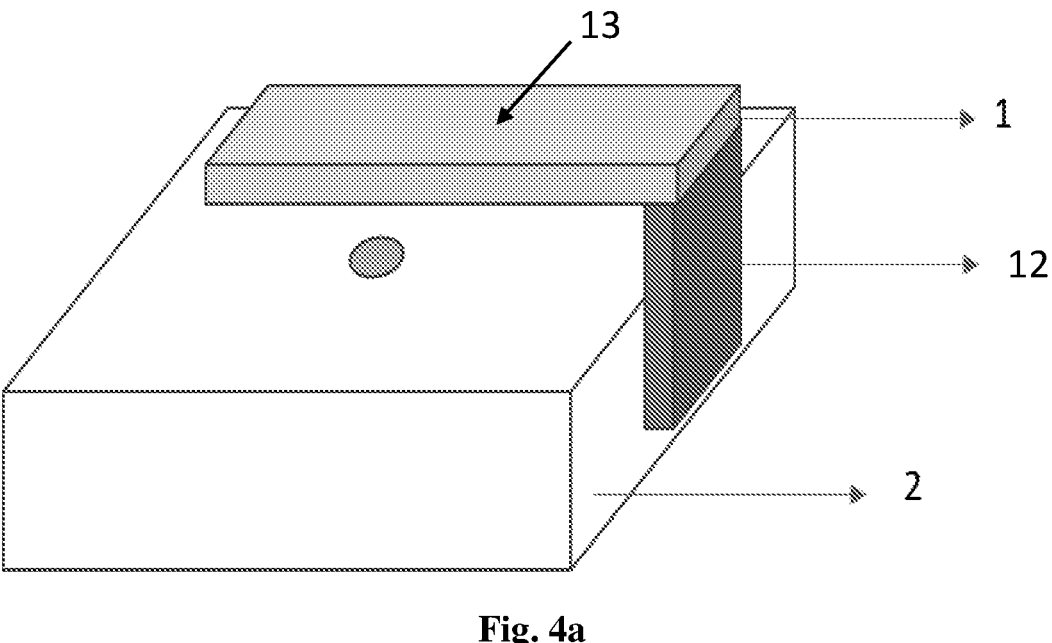
FIG. 4a and FIG. 4b show the optical microscopy unit with a detachable first light source unit in the use mode and in the off mode, respectively, in an example.
Figure 4B:
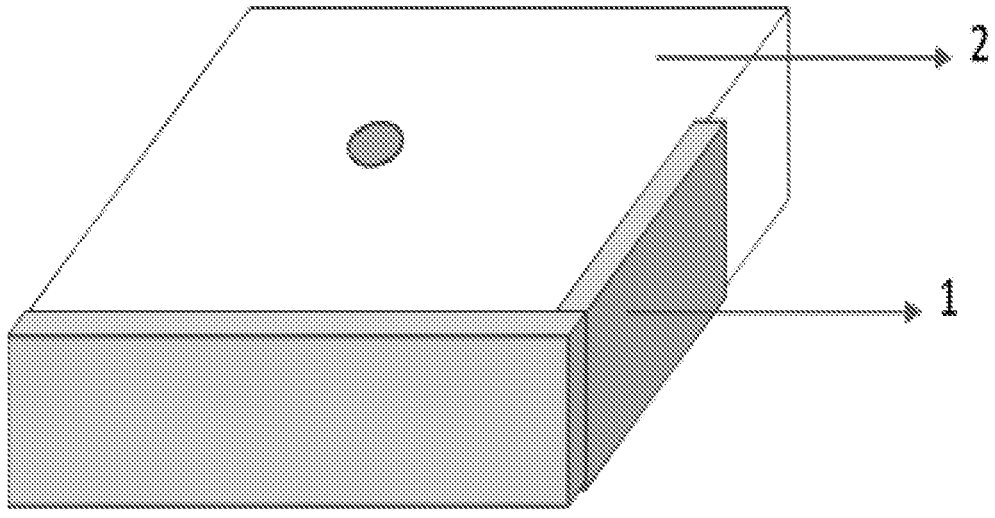

FIG. 4a and FIG. 4b show the optical microscopy unit 2 with a detachable first light source unit 1 in the use mode and in the off mode, respectively, in an example. As described with reference to FIG. 3a, the first light source unit 1 of FIG. 4a has a first part 12 and a second part 13. The second part 13 may be any as shown in FIG. 3b, FIG. 3c, FIG. 3d. The second part 13 is detachable from the first part 12. In an example, the second part 13 is magnetically coupled with the first part 12, so that the second part 13 can be positioned on the top surface or on the side surface of the first part 12. FIG. 4a shows the first light source unit 1 is the use mode or on-mode in which the second part 13 is placed on the top surface of the first part 12. FIG. 4b shows the first light source unit 1 is the off-mode in which the second part 13 is placed on the side surface of the first part 12.

Figure 5:
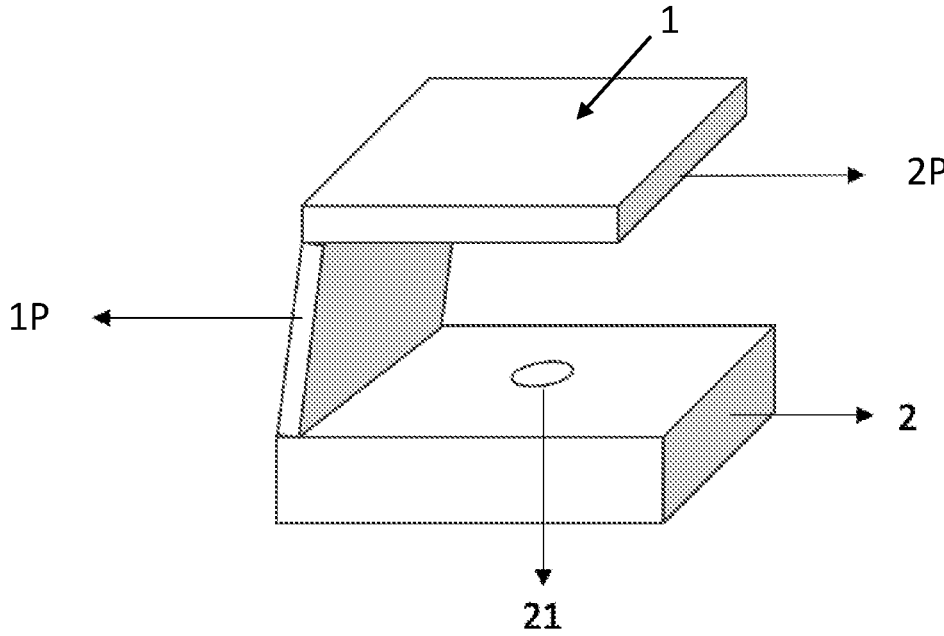
FIG. 5 shows the optical microscopy unit with a fixed first light source unit, in an example.

FIG. 5 shows the optical microscopy unit 2 with a fixed first light source unit 1, in an example. The fixed first light source unit 1 has two parts, one a supporting part 1P and other a light source part 2P. The light source part 2P may be any as shown in FIG. 3b, FIG. 3c, FIG. 3d. The supporting part 1P is attached to the optical microscopy unit 2. The supporting part 1P is positioned on the optical microscopy unit 2 at an angle in the range from 25 degrees to 110 degrees with respect to the optical microscopy unit 2. The distance between the light source part 2P and the optical microscopy unit 2 is as per the type of light source, such as a diffuse light source and a point light source.

FIG. 6a and FIG. 6b show the optical microscopy unit 2 with a foldable first light source unit 1 in the off mode and the use mode, respectively, in an example. As described with reference to FIG. 3a, the first light source unit 1 of FIG. 6a has a first part 3P and a second part 4P. The second part 4P may be any as shown in FIG. 3b, FIG. 3c, FIG. 3d. In an example, the second part 4P is foldable about the first part 3P through a magnetic property or foldable screw-based mechanism. FIG. 6a shows the first light source unit 1 is the use mode or on-mode in which the first part 3P and the second part 4P are folded and sit flat on the optical microscopy unit 2. FIG. 6b shows the first light source unit 1 is the off-mode in which the second part 4P is folded about the first part 3P. The distance between the second part 4P and the optical microscopy unit 2 is also adjustable. This configuration of the first light source unit 1 provides for the portability of the apparatus 100, protection of microscopy modules from external physical and chemical damage and compactness to the apparatus 100.

In an example, the apparatus 100 comprises an additional LED disposed at a peripheral surface of the sample holding unit 4, where the LED is to provide light rays to the sample in the sample holding unit 4 for the dark field and filter field microscopy. The LED may be a white LED or an LED of different wavelengths. The light rays from the LED is passed through the sample holding unit 4 above the critical angle (>40 degrees) and the light rays undergo total internal reflection in the sample holding unit 4. The light reflected from the sample in the sample holding unit 4 is observed by the microscopy assembly under the black background. Said described arrangement of the LED at the peripheral surface of the sample holding unit 4 is used for the dark and filter field microscopy.

FIG. 7 shows the optical microscopy unit 2 with the second light source unit 5, in an example. The second light source unit 5 is mounted inside the optical microscopy unit 2 adjacent to the one or more microscopy modules 21, where the second light source unit 5 is to provide light to the sample in the sample holding unit 4 from inside of the optical microscopy unit 2. The second light source unit 5 is an internal light source for filter field and dark field microscopic features. As shown, the second light source unit 5 comprises an LED 1I and a light directing element 1VIII. Peripheral surfaces of the LED 1I are made of an opaque material. The light directing element 1VIII is coupled to the LED 1I to direct light rays emitting from the LED 1I onto the sample holding unit 4 over the optical microscopy unit 2.

The light directing element 1VIII is used for focusing the light rays coming from the LED 1I to the sample in the sample holding unit 4. The light directing element 1VIII is made of plastic, polymer, or composite materials. The side surfaces of the light directing element 1VIII are made reflective. The surface of the light directing element 1VIII towards the sample side is angled at an angle in the range from 10 to 180 degrees to provide a variable range of the critical angles for directing the light towards the sample in the sample holding unit 4 located above the optical microscopy unit 2. The light directing element 1VIII may be of a ring shape around the microscopy module 21 or of any other shape. The intensity of light of the LED 1I may be controlled by a digital device.

The apparatus 100 further comprises a focusing platform for the purpose of movement of the microscopy module(s) for adjusting the focus of the optical lens assembly. The focusing platform may be a common focusing platform for all microscopy modules or include individual focusing platforms for each of the microscopy modules which can be controlled independently or a combination of both types of platforms for the fine and coarse focusing. The focusing platform is to provide a digitally controlled or automated controlled vertical movement of microscopy modules. The movement in the vertical direction is digitally controlled and the movement is directly controlled through a digital device, such as, but not limited to, a smartphone, a tablet, a computer, or any other computing device. The controlled movement of the focusing platform may be carried out through various mechanisms, such as, but not limited to, a voice coil motor, a solenoid electromagnetic mechanism, a piezoelectric based mechanism, a PCB motor-based mechanism.

Figure 8A:
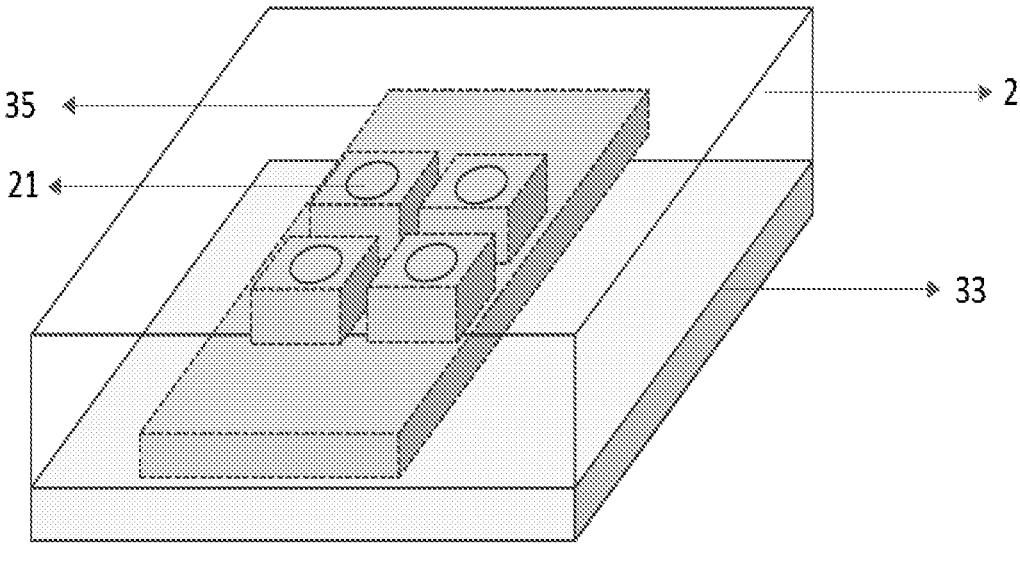
FIG. 8a shows the optical microscopy unit with multiple microscopy modules on a focusing platform, in an example.

FIG. 8a shows the optical microscopy unit 2 with multiple microscopy modules 21 on a focusing platform 35, in an example. In an example, a single microscopy module or multiple microscopy modules 21 are positioned on the focusing platform 35. The fine movement of the focusing platform 35 in the vertical direction is used for the adjusting the focus of the optical lens assembly in the microscopy module 21. The movement may be controlled by a mechanism, such as but not limited to, a solenoid-based arrangement, an electromagnetic arrangement, a piezoelectric movement-based arrangement, a fine screw-based mechanism. The single microscopy module or the multiple microscopic modules 21 may be moved by different levels by the focusing platform. The movement of the focusing platform 35 is directly controlled through a user interface or a digital device, which makes the apparatus 100 more user-friendly for focusing and imaging samples through the fine controlled movement in a vertical direction.

Figure 8B:
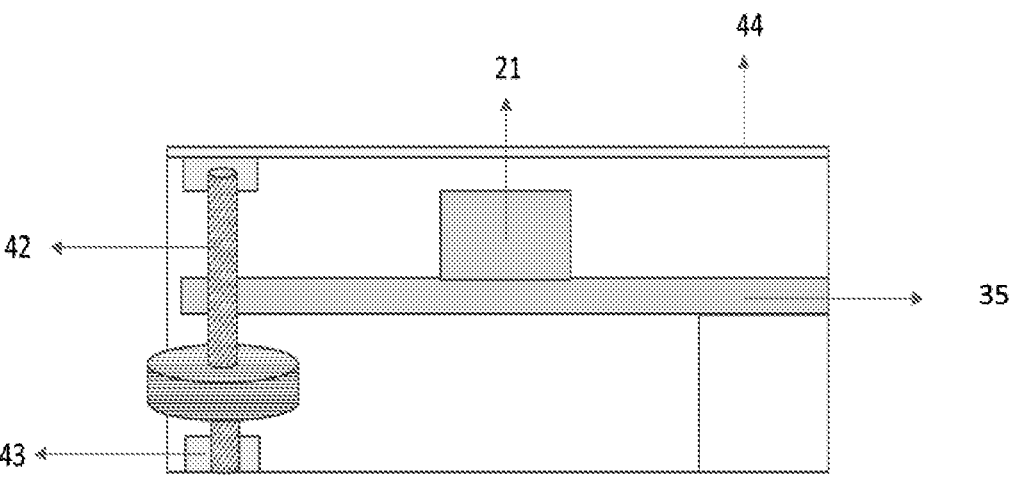
FIG. 8b shows the optical microscopy unit with one microscopy module and a screw-based mechanism for the focusing platform, in an example.

FIG. 8b shows the optical microscopy unit 2 with one microscopy module 21 and a screw-based mechanism for the focusing platform 35, in an example. The microscopic module 21 is mounted on the focusing platform 35. A rotating screw 42 is positioned in the focusing platform 35 through the threading and both ends are placed in respective housings 43 in the optical microscopy unit 2. The threading size and screw dimension are decided based on the desired vertical movement of the focusing platform 35 for focusing. The adjustable movement in the vertical direction is controlled by the fine movement of the rotating screw 42. The focusing platform 35 is positioned on one side. The rotating screw 42 is placed in a wall of the optical microscopy unit 2, such the a portion of the rotating screw 42 protrudes out from the wall for the manual operation of the rotating screw 42. The movement of the rotating screw 42 creates pressure on the focusing platform 35 and moves the focusing platform 35 in the vertical direction. The fine movement depends on the pressure applied on the focusing platform 35 and the thickness of the focusing platform 35. The said arrangement provides fine movement in a vertical direction for the fine focusing for imaging a sample. The rotating screw 42 can connect with an electrical motor for the automated controlled movement of the screw 42 and the focusing platform 35.

Figure 8C:
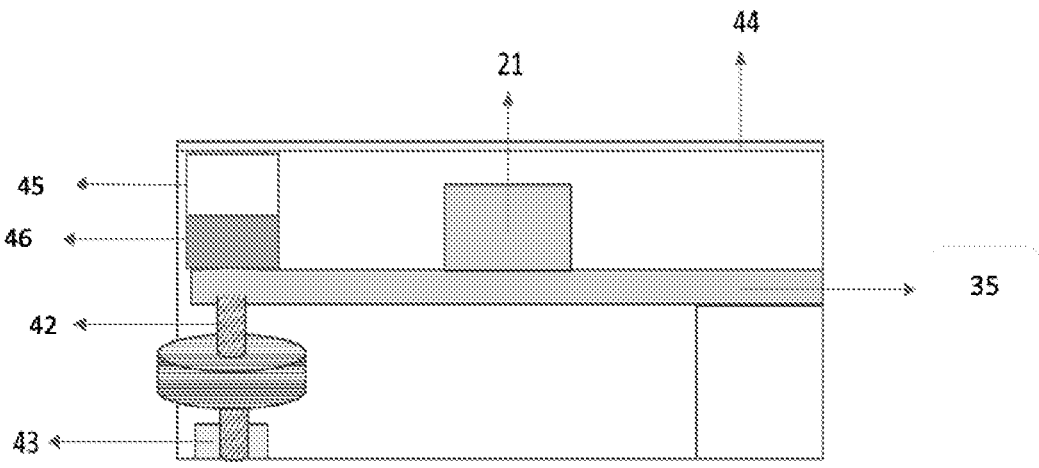
FIG. 8c shows the optical microscopy unit with one microscopy module and a screw-based mechanism and a spacer assembly, in an example.

FIG. 8c shows the optical microscopy unit 2 with one microscopy module 21 and a screw-based mechanism and a spacer assembly, in an example. As shown, the optical microscopy unit 2 comprises a compressible spacer 46 between the focusing platform 35 and a top surface of the optical microscopy unit 2. The compressible spacer 46 is to control the movement of the focusing platform 35. The optical microscopy unit 2 also has a supporting unit 45 between the compressible spacer 46 and the top surface of the optical microscopy unit 2. The movement of the rotating screw 42 creates pressure on the focusing platform 35 and the compressible spacer 46. The fine movement of the focusing platform 35 depends on the pressure applied on the focusing platform 35 and the compressibility and thickness of the compressible spacer 46. The compressible spacer 46 may be made of a polymer or rubber. The said arrangement provides fine movement in the vertical direction for the fine focusing for imaging the sample.

Further, in an example, the optical microscopy unit 2 comprising a focusing barrel unit (not shown) corresponding to each of the one or more microscopy modules 21. The focusing barrel unit is to operate the corresponding microscopy module 21 for adjusting focus for imaging the sample in the sample holding unit 4. The focusing barrel allows for the individual focusing for the respective microscopy module. The optical microscopy unit 2 is mounted inside the focusing barrel. The focusing barrel is positioned in the housing of the optical microscopy unit 2 and an image capturing assembly is located below the focusing barrel. The focusing barrel has the controlled movement of the optical lens assembly in the microscopy module 21 with respect to the optical microscopy unit 2 for focusing the sample. The controlled movement of the focusing barrel of the microscopy module for fine focusing is carried out through various mechanisms, such as, but not limited to, a voice coil motor, a solenoid electromagnetic based arrangement, a piezoelectric based arrangement, a PCB motor-based arrangement, etc. The movement can be control through a digital device. The digital-driven fine focusing gives the flexibility of the apparatus 100 for a wide range of sample size as per the required applications or sample morphology.

Returning to FIG. 1, the protecting layer 3 is disposed on the optical microscopy unit to protect the optical microscopy unit or the one or more microscopy modules from physical and chemical damages. In an example, the protective layer 3 is made of a high refractive medium and/or is a wavelength-specific filter for filter field or fluorescence microscopy. The protective layer 3 may be of a high refractive index polymeric material or a plastic thin film, having a wide range of the refractive indices greater than 1.3 which enhances the performance of the optical microscopy unit 2 by providing a higher refractive medium between the sample and the microscopy module 21 instead of air as a medium therebetween.

In an example, the protective layer 3 is a transparent film made of a transparent polymer, or plastic, or glass, or a composite material, or any transparent materials or combinations of thereof. The protective layer 3 may be a disposable or reusable transparent film that can eliminate the cleaning of the optical microscopy unit 2 and increase the life of the overall apparatus 100 as compared to conventional objective lens system where direct contact with the sample may damage the lens assembly due to chemical and biological damage through microbial growth on lens assembly.

In an example, the protective layer 3 may be a transparent film and is a wavelength-specific filter, where the wavelength-specific field may be a color filter, a glass slide, a gelatine or a dichroic filter that can be used to detect the specific characteristic wavelength of light emitted from the sample for its quantitative or qualitative estimation or to view the sample in a specific light. The protective layer 3 can be changed as per the required application of the wavelength-specific filter and it gives a wide range of applications for the filter field characteristics.

Returning to FIG. 1, the sample holding unit 4 includes a single compartment or multiple compartments for holding one or more samples. The sample holding unit 4 may be a single-use unit or a multiple-use unit with or without continuous sampling arrangement and/or micro-fluidic arrangement. The sample holding unit 4 may be with or without a wavelength-specific filter for observing objects or samples. In an example, the sample holding unit 4 comprises a simple slide or micro-fluidic based system or micro-fluidic based system with a characteristic light filter that makes the apparatus 100 usable for a wide range of applications in analytical, diagnosis and research application to observe the characteristic objects or samples.

In an example, the sample holding unit 4 is movable in a direction along a plane of the protective layer 3. The movement of the sample holding platform 4 in the plane of the protective layer may controlled manually or through a digitally controlled automated system, which makes the apparatus 100 more user-friendly. With the movable sample holding unit 4, the sample in the entire compartment can be scanned and imaged using the apparatus 100, which makes the apparatus 100 more robust in comparison to the conventional microscope that causes the stress on the eye of users on long term use for observing the object or sample manually and complexity in finding the object in analytical or diagnostic applications.

In an example, the sample holding unit 4 may be moved through an artificial intelligence (AI) based system or a machine learning based system or a combination thereof.

In an example, the sample holding unit 4 may be moved through a digitally controlled piezoelectric based system, a solenoid electromagnetic based system, an adjustable screw, a gear mechanism, or a piezoelectric motor based system.

In an example, the sample holding unit 4 is used for holding of the sample in batch or continuous mode, in a single compartment or in multiple compartments, with or without characteristic features such as specific to a wavelength of light. In an example, the sample holding unit 4 has a compartment with a single inlet and single outlet, or multiple inlets and outlets, or any combinations thereof.

In an example, the sample holding unit 4 comprises single or multiple microfluidic channels in series or parallel for the measurement of single or multiple samples.

In an example, the sample holding unit 4 comprises a micro-fluidic channel arrangement, such as a flow focusing arrangement, T-junction arrangement, etc.

In an embodiment, the sample holding unit 4 has on any one planar side or on both planar sides a wavelength-specific filter that allows the desired wavelength of light to through. The middle part of such a sample holding unit 4 may have one or more compartments for holding the sample(s) and a sample injection port for each compartment and an LED.

The light source unit passes the light through the sample at a different angle (20 to 140 Degree) or intensity and different wavelengths as per the required application. The sample holding unit 4 is visible in the observing area and the rest of the area is covered with a transparent material or a reflecting material or a low refractive index material or a light-absorbing material or a black color coating.

Figure 9:
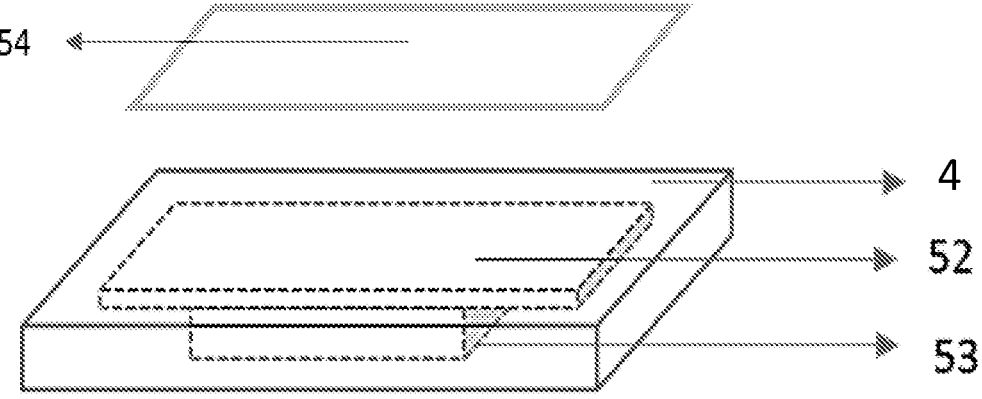
FIG. 9 shows a sample holding unit with a single compartment and with a removable top cover, in an example.

FIG. 9 shows a sample holding unit 4 with a single compartment 53 and with a removable top cover 54, in an example. The compartment 53 may be configured to hold a liquid sample, a solid sample or a semi-solid sample or other objects that can be imaged using the apparatus 100. The top cover 54 is placed on the compartment 53 for the uniformly holding of the samples. The sample holding unit 4 may have a cavity 52 for placing and holding the top cover 54.

The top cover 54 may be made of any transparent materials which may include a polymer or plastic or glass or any transparent materials. The area and the thickness/depth of the compartment 53 may vary as per the required application. More specifically, the thickness/depth of the compartment 53 varies in the range from 5 microns to 5000 microns to see the varying range of the samples, such as bacteria, human blood cells, protozoa and microorganisms, without overlapping of the samples on each other.

In an example, the top cover 54 may be wavelength-specific filter which allow the light of a desirable wavelength to pass through the top cover 54.

Figure 10A:
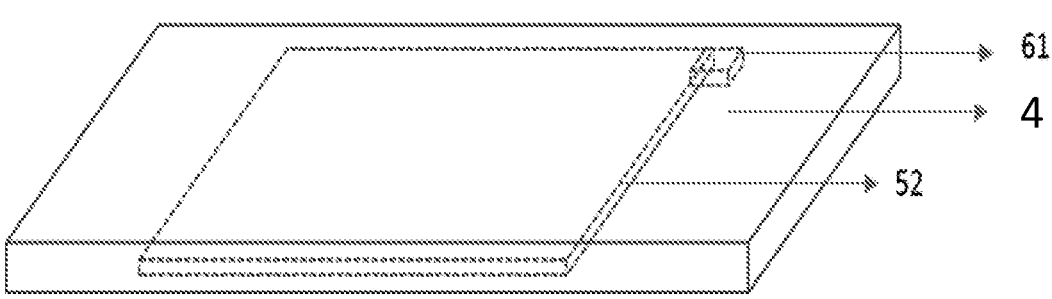
FIG. 10a shows a sample holding unit having a single compartment with a sample injection port, in an example.
Figure 10B:
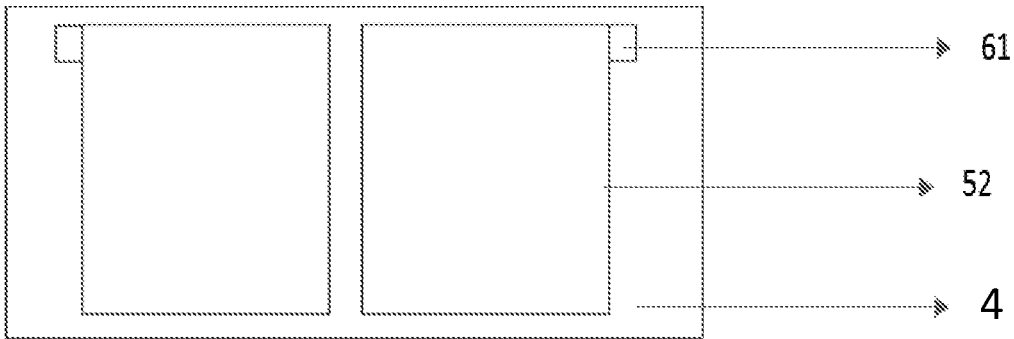
FIG. 10b shows a top view of a sample holding unit having two compartments with respective sample injection ports, in an example.
Figure 10C:
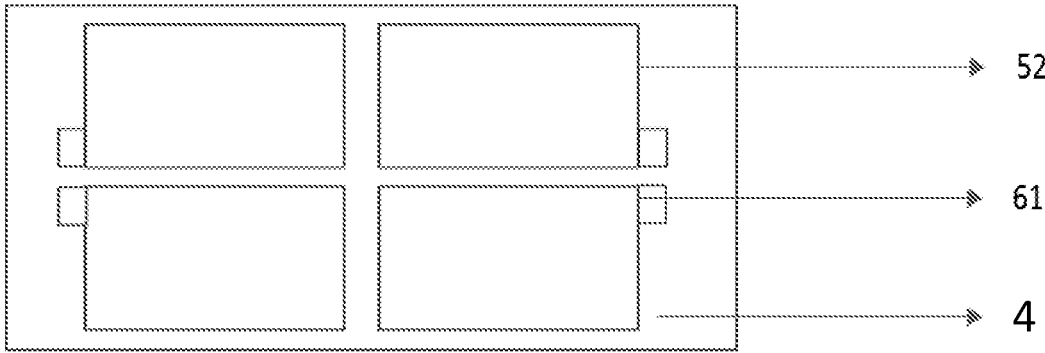
FIG. 10c shows a top view of a sample holding unit having four compartments with respective sample injection ports, in an example.

FIG. 10a shows a sample holding unit 4 having a single compartment 52 with a sample injection port 61, in an example. The sample holding unit 4 with a sample injection port is used for handling of hazardous or pathogenic materials or nonpathogenic samples having small sized object (<500 microns). FIG. 10b shows a top view of a sample holding unit 4 having two compartments 52 with respective sample injection ports 61, in an example. FIG. 10c shows a top view of a sample holding unit 4 having four compartments 52 with respective sample injection ports 61, in an example. Multiple compartments with respective sample injection ports may be used for analysis of the multiple samples or a single sample in various filter field characteristics at the same time. The sample holding unit 4 as shown in FIGS. 10a, 10b and 10c provides an advantage of the direct incorporation of the liquid sample through the sample injection port 61 without an external coverslip or any other sample preparation. The sample spreads through the compartment 52 through the capillary action. The top and bottom sides of the sample holder unit 4 may be transparent or comprise of a wavelength-specific filter. The shape and dimensions of the compartment 52 and its number is not restricted to any of the geometry and size.

Figure 11A:
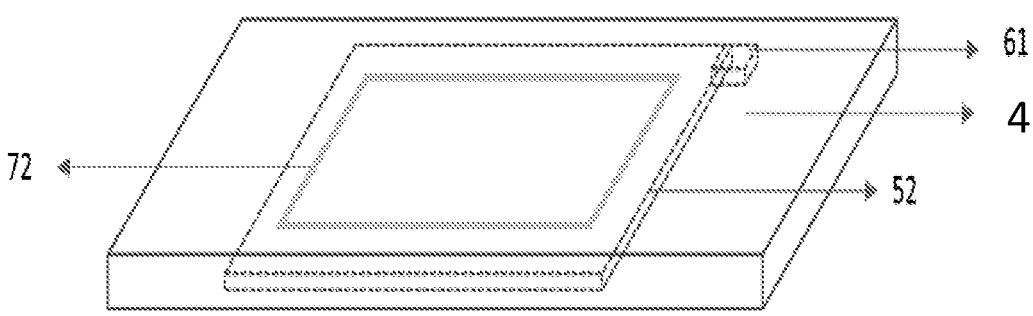
FIG. 11a shows the sample holding unit of FIG. 10a with a wavelength-specific filter, in an example.

FIG. 11a shows the sample holding unit 4 of FIG. 10a with a wavelength-specific filter 72, in an example. The wavelength-specific filter 72 allows light of a specific wavelength to pass through. Such an assembly of sample holding unit 4 is used for the observing of the sample in the desirable wavelength of light. The wavelength-specific filter 72 may be a gelatin filter or a color filter or dichroic filter or any of the color dyes or a chromophore or any of the materials which can absorb or emit the desirable wavelength of light.

In an example, the apparatus 100 comprises a first wavelength-specific filter disposed on a first planar side of the at least one compartment of the sample holding unit 4. In an example, the apparatus 100 comprises a second wavelength-specific filter disposed on a second planar side of the at least one compartment of the sample holding unit 4, where the second planar side is opposite to the first planar side.

In an example, the sample holding unit 4 comprises a wavelength-specific coating on one of both of the planar sides or a filter arrangement on one or both of the planar sides.

Figure 11B:
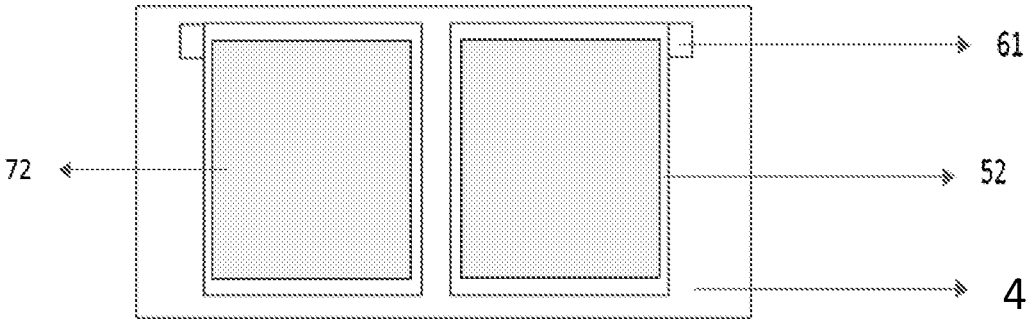
FIG. 11b shows the sample holding unit of FIG. 10b having two compartments with respective wavelength-specific filters, in an example.
Figure 11C:
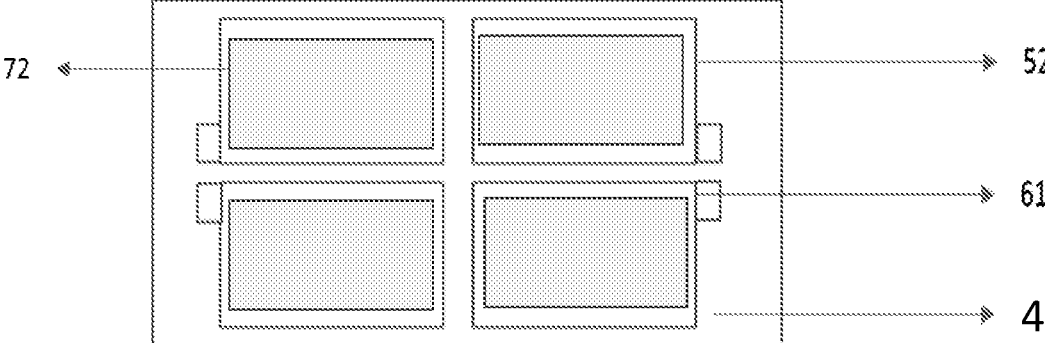
FIG. 11c shows the sample holding unit of FIG. 10c having four compartments with respective wavelength-specific filters, in an example.

FIG. 11b shows the sample holding unit 4 of FIG. 10b having two compartments 52 with respective wavelength-specific filters 72, in an example. FIG. 11c shows the sample holding unit 4 of FIG. 10c having four compartments 52 with respective wavelength-specific filters 72, in an example. In an example, the wavelength-specific filter 72 can be separated or is fixed to the compartment 52. Each compartment comprises a similar or different wavelength-specific filter. Each compartment has the sample injection port where a sample can be loaded into the compartment and spread throughout the compartment through the capillary action.

Figure 12A:
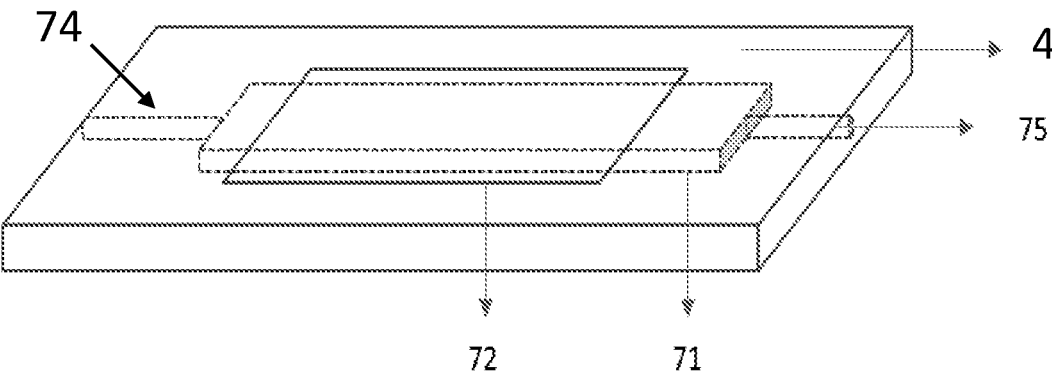
FIG. 12a shows a sample holding unit having a single compartment with an inlet and an outlet and having a wavelength-specific filter, in an example.
Figure 12B:
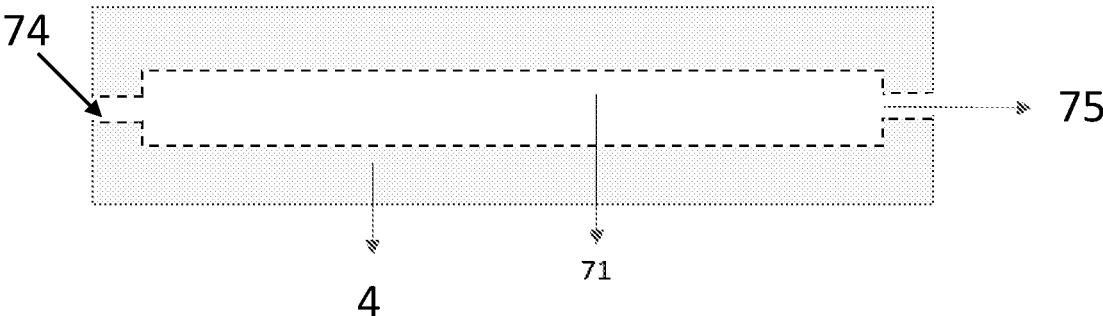

FIG. 12a shows a sample holding unit 4 having a single compartment 71 with an inlet 74 and an outlet 75 and having a wavelength-specific filter 72, in an example. The inlet 74 is for inflow of the sample into compartment 71 of the sample holding unit 4 and the outlet 75 is for outflow of the sample from the compartment 71. The sample holding unit 4 of FIG. 12a is used for continuous sample analysis. FIG. 12b shows a top view of the sample holding unit 4 of FIG. 12a.

Figure 12C:
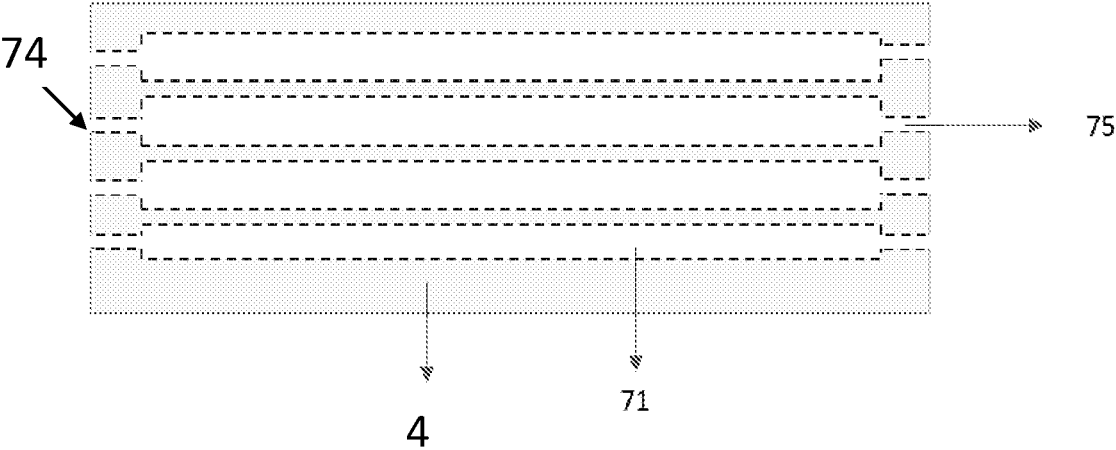
FIG. 12c shows a top view of a sample holding unit with four compartments and respective inlets and outlets, in an example.

FIG. 12c shows a top view of a sample holding unit 4 with four compartments 71 and respective inlets 74 and outlets 75, in an example.

The sample holding units 4 shown in FIGS. 12, 12b and 12c can be used for handling of single or multiple samples at the same time. All sample holding compartments or channels may have similar or different wavelength-specific filters as per the required application.

Figure 12D:
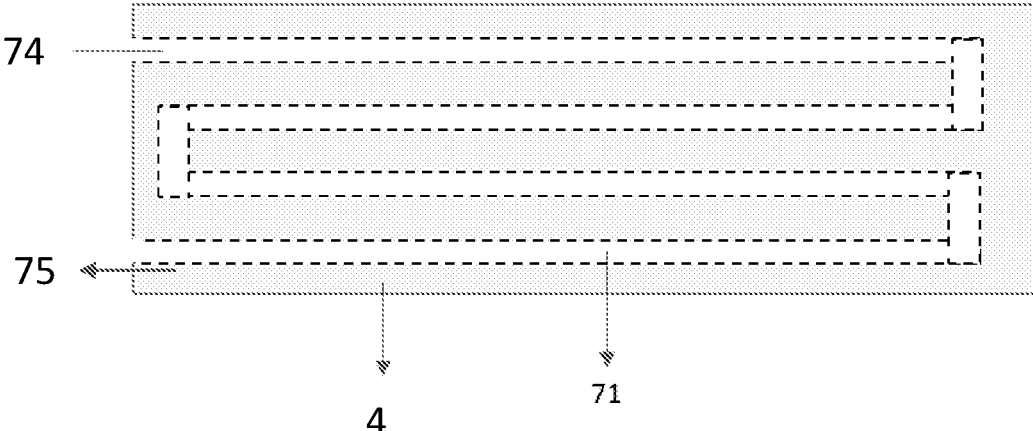
FIG. 12d shows a top view of a sample holding unit having a channel-like compartment with an inlet and an outlet, in an example.

FIG. 12d shows a top view of a sample holding unit 4 having a channel-like compartment 71 with an inlet 74 and an outlet 75, in an example. The inlet 74 and the outlet 75 are shown to be on the same side of the sample holding unit 4. In an example, the inlet and the outlet of the channel-like compartment can on different sides of the sample holding unit 4.

Figure 13:
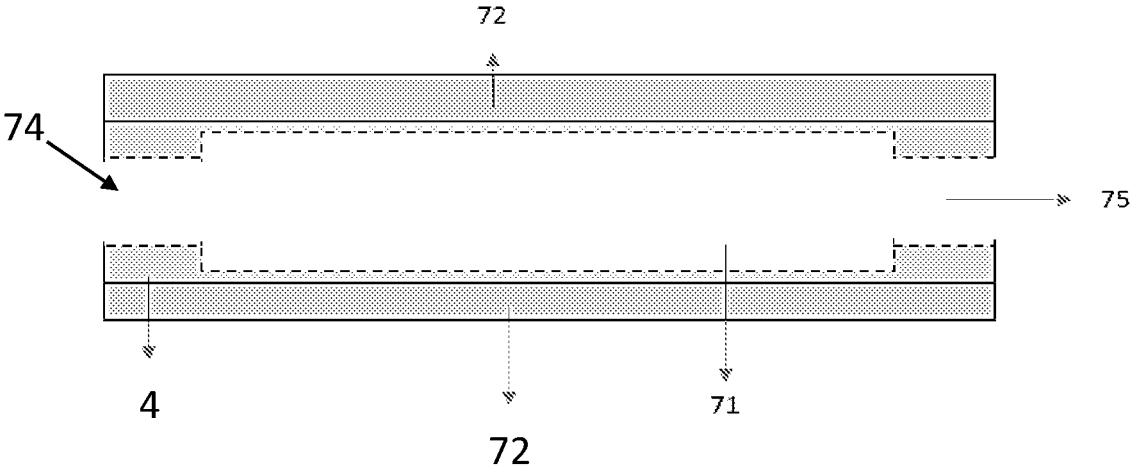
FIG. 13 shows a side view of a sample holding unit having a single compartment with an inlet and an outlet and wavelength-specific filters of the planar sides of the sample holding unit, in an example.

FIG. 13 shows a side view of a sample holding unit 4 having a single compartment 71 with an inlet 74 and an outlet 75 and wavelength-specific filters 72 of the planar sides of the sample holding unit 4, in an example.

The continuous sample analysis is done for online observation of a single sample or multiple samples or a single sample in multiple characteristics like different magnification, resolution, wide field of view, filter field characteristics, etc.

In an example, the operation of the components of the apparatus 100 can be controlled through a digital device which makes the apparatus 100 more user-friendly for various applications, such as, but not limited to, analytical application, diagnosis application, education and research application, where user availability may not possible at location site or user may operate the apparatus 100 through his digital device in proximity of the apparatus 100 or remote from the apparatus 100.

In an example, the apparatus 100 may include one or more ports for the connection of electronic components or digital devices or supplying power to LEDs or other components of the apparatus 100. The port may include, but is not restricted to, a power-supply port, a detachable magnetic pin-based port, a USB port, a wire-based port, Bluetooth port, a wireless port and such.

As described earlier, each microscopy module 21 comprises an optical lens assembly with eight to sixteen lens elements such that the optical lens assembly has the following characteristics:

total magnification in a range from 10× to 2000×,
numerical aperture (NA) in a range of 0.015 to 0.176,
a half field of view (HFOV) in a range 10 to 38.35,
optical magnification in a range of 1× to 7.8×,
airy radius in a range of 3.01 to 23.25,
depth of field in a range of 0.8875 to 337.71, and
total resolution is at least 0.1 micron or more than 0.1 micron Tables 1 to 5 tabulate the optical parameters of the examples of the optical lens assembly described herein.

TABLE 1

Optical parameter of optical lens assembly

| Number of lens elements | HFOV [Degree] | NA | Optical magnification | Depth of field (micron) | Airy radius (Micron) |
|---|---|---|---|---|---|
| 10 | 12.6 | 0.072 | 1X | 103.83 | 4.76 |
| 8 | 12.6 | 0.015 | 7.8X | 68.55 | 23.25 |
| 11 | 30 | 0.025 | 5X | 39.73 | 14.74 |
| 11 | 30 | 0.024 | 6X | 30.17 | 8.28 |
| 12 | 25 | 0.05 | 2X | 58.23 | 7.14 |
| 12 | 13 | 0.059 | 3X | 20.01 | 6.28 |
| 12 | 13 | 0.113 | 1X | 48.39 | 3.25 |
| 12 | 16 | 0.027 | 4X | 51.58 | 13.44 |
| 12 | 16 | 0.054 | 2X | 52.62 | 6.79 |
| 14 | 23 | 0.041 | 1.6X | 337.71 | 8.51 |
| 15 | 23 | 0.044 | 2X | 76.89 | 8.21 |
| 12 | 20 | 0.066 | 1X | 33.90 | 5.56 |

TABLE 2

Optical parameter of optical lens assembly

| Number of lens elements | HFOV (degree) | NA | Optical magnification | Depth of field (micron) | Airy radius (micron) |
|---|---|---|---|---|---|
| 10 | 12.6 | 0.035 | 2X | 121.38 | 10.31 |
| 10 | 20 | 0.046 | 2X | 69.99 | 7.82 |
| 11 | 10 | 0.097 | 1X | 64.47 | 3.75 |
| 12 | 25 | 0.025 | 3X | 109.85 | 14.71 |
| 12 | 20 | 0.041 | 2X | 88.83 | 8.81 |
| 12 | 21 | 0.103 | 1X | 55.55 | 3.487 |
| 12 | 25 | 0.047 | 3X | 28.89 | 7.67 |
| 15 | 18 | 0.068 | 1X | 132.11 | 5.38 |
| 16 | 38.35 | 0.176 | 1X | 164.1 | 5.99 |
| 14 | 36 | 0.052 | 2X | 55.68 | 6.98 |
| 15 | 38.35 | 0.072 | 1X | 117.12 | 5.06 |

TABLE 3

Optical parameter of optical lens assembly

| Number of lens elements | HFOV (degree) | NA | Optical Magnification | Depth of field (micron) | Airy radius (micron) |
|---|---|---|---|---|---|
| 11 | 30 | 0.057 | 3X | 13.124 | 6.413 |
| 13 | 33 | 0.055 | 2X | 50.9175 | 6.673 |
| 12 | 30 | 0.038 | 4X | 26.76 | 9.67 |
| 11 | 20 | 0.104 | 2X | 3.003 | 3.655 |
| 11 | 30 | 0.116 | 1X | 3.60 | 3.14 |
| 10 | 30 | 0.12 | 1X | 41.46 | 3.01 |
| 13 | 30 | 0.061 | 2X | 40.42 | 5.94 |
| 10 | 20 | 0.057 | 2X | 45.74 | 6.32 |
| 9 | 18 | 0.070 | 2X | 31.23 | 5.229 |
| 13 | 20 | 0.033 | 2X | 132.64 | 10.78 |

TABLE 3-continued

Optical parameter of optical lens assembly

| Number of lens elements | HFOV (degree) | NA | Optical Magnification | Depth of field (micron) | Airy radius (micron) |
|---|---|---|---|---|---|
| 11 | 20 | 0.026 | 3X | 93.495 | 13.57 |
| 11 | 10 | 0.067 | 2X | 34.11 | 5.46 |
| 12 | 18 | 0.021 | 4X | 80.78 | 16.82 |
| 13 | 17 | 0.062 | 1X | 154.483 | 5.814 |

TABLE 4

Optical parameter of optical lens assembly

| Number of lens elements | HFOV (degree) | NA | Optical Magnification | Depth of field (micron) | Airy radius (micron) |
|---|---|---|---|---|---|
| 12 | 23 | 0.042 | 1X | 336.32 | 8.575 |
| 12 | 25 | 0.024 | 3X | 46.7622 | 14.71 |
| 12 | 20 | 0.064 | 1X | 147.38 | 5.679 |
| 12 | 20 | 0.041 | 3X | 52.559 | 8.818 |
| 12 | 20 | 0.088 | 1X | 80.3544 | 4.198 |
| 12 | 22 | 0.057 | 2X | 19.404 | 6.315 |
| 12 | 28 | 0.035 | 4X | 30.6919 | 10.36 |
| 12 | 21 | 0.052 | 2X | 54.7025 | 6.916 |
| 12 | 16 | 0.045 | 2X | 31.1825 | 8.006 |
| 12 | 20 | 0.095 | 1X | 6.7615 | 3.921 |
| 12 | 20 | 0.046 | 2.6X | 75.3525 | 8.89 |
| 12 | 13 | 0.073 | 1.5X | 47.95 | 4.964 |
| 12 | 20 | 0.070 | 2X | 0.8875 | 5.308 |

TABLE 5

Optical parameter of optical lens assembly

| Number of lens elements | HFOV (degree) | NA | Optical Magnification | Depth of field (Micron) | Airy radius (Micron) |
|---|---|---|---|---|---|
| 14 | 23 | 0.032 | 2.4X | 105.97 | 11.34 |
| 14 | 21 | 0.049 | 1.4X | 127.04 | 7.382 |
| 14 | 23 | 0.049 | 2X | 124.41 | 7.391 |
| 14 | 30 | 0.081 | 1.5X | 42.60 | 4.58 |
| 16 | 19 | 0.065 | 1.5X | 63.27 | 5.57 |
| 14 | 20 | 0.095 | 2X | 33.819 | 3.809 |
| 15 | 38.35 | 0.048 | 1.8X | 45.75 | 5.063 |
| 15 | 25 | 0.061 | 2X | 41.112 | 5.99 |
| 15 | 18 | 0.068 | 2X | 36.604 | 5.378 |

The descriptions of the Indian application numbers 202021003723, 202021010568, 202121034793, 202121034794, and 202121034795 are incorporated by reference in the present disclosure for the purpose of describing the optical lens assembly of the optical microscopy unit of the compact portable multimodal microscopy apparatus.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A compact portable multimodal microscopy apparatus comprising:

an optical microscopy unit including one or more microscopy modules, wherein each microscopy module comprises an optical lens assembly with eight to sixteen lens elements having a total magnification in a range of 10× to 2000×;

a protective layer disposed on the optical microscopy unit to protect the optical microscopy unit from physical and chemical damages;

a sample holding unit disposed on the protective layer, wherein the sample holding unit includes at least one compartment to hold a sample to be imaged by the one or more microscopy modules;

a first light source unit mounted on the optical microscopy unit, wherein the first light source unit is to provide light to the sample in the sample holding unit from outside of the optical microscopy unit; and a second light source unit mounted inside the optical microscopy unit adjacent to the one or more microscopy modules, wherein the second light source unit is to provide light to the sample in the sample holding unit from inside of the optical microscopy unit.

2. The compact portable multimodal microscopy apparatus as claimed in claim 1, wherein first light source unit is movable relative to the optical microscopy unit to vary a distance between a top surface of the sample holding unit and a bottom surface of the first light source unit.

3. The compact portable multimodal microscopy apparatus as claimed in claim 1, wherein the first light source unit is a point light source or a diffuse light source or a combination thereof, and is detachably mounted on the optical microscopy unit.

4. The compact portable multimodal microscopy apparatus as claimed in claim 1, wherein the first light source unit has at least one of variable intensity of light, variable wavelength of light, and variable area of light exposure on the sample in the sample holding unit.

5. The compact portable multimodal microscopy apparatus as claimed in claim 1, wherein the first light source unit comprises:

a light directing element with a reflective top surface from outside;

at least one light emitting diode placed on a side surface of the light directing element, wherein peripheral surfaces of the at least one light emitting diode are made of an opaque material;

a diffuser coupled to a bottom surface of the light directing element; and a convex lens or a plano-convex lens placed proximal to the diffuser, wherein light rays emitted by the at least one light emitting diode are reflected from the reflective top surface of the light directing element and diffused through the diffuser onto the convex lens or the plano-convex lens and further onto the sample holding unit.

6. The compact portable multimodal microscopy apparatus as claimed in claim 1, wherein the first light source unit comprises:

a light directing element with a reflective top surface from outside;

a light emitting diode placed adjacent to a side surface of the light directing element;

a light guiding element adjacent to a bottom surface of the light directing element; and a diffuser adjacent to a bottom surface of the light guiding element, wherein light rays emitted by the light emitting diode are reflected from the reflective top surface of the light directing element, passed through the light guiding element, and diffused through the diffuser onto the sample holding unit.

7. The compact portable multimodal microscopy apparatus as claimed in claim 1, wherein the second light source unit comprises:

a light emitting diode, wherein peripheral surfaces of the light emitting diode are made of an opaque material; and a light directing element coupled to the light emitting diode to direct light rays emitting from the light emitting diode onto the sample holding unit.

8. The compact portable multimodal microscopy apparatus as claimed in claim 1, wherein the protective layer is a wavelength-specific filter.

9. The compact portable multimodal microscopy apparatus as claimed in claim 1, wherein the sample holding unit is movable in a direction along a plane of the protective layer.

10. The compact portable multimodal microscopy apparatus as claimed in claim 1, wherein the sample holding unit comprises a sample injection port corresponding to each of the at least one compartment.

11. The compact portable multimodal microscopy apparatus as claimed in claim 1, wherein the at least one compartment comprises an inlet for inflow of the sample and an outlet for outflow of the sample.

12. The compact portable multimodal microscopy apparatus as claimed in claim 1, wherein the compact portable multimodal microscopy apparatus comprises a light emitting diode disposed at a peripheral surface of the sample holding unit, wherein the light emitting diode is to provide light rays to the sample in the sample holding unit.

13. The compact portable multimodal microscopy apparatus as claimed in claim 1, wherein the optical microscopy unit comprising a focusing barrel unit corresponding to each of the one or more microscopy modules, wherein the focusing barrel unit is to operate the corresponding microscopy module for adjusting focus for imaging the sample in the sample holding unit.

14. The compact portable multimodal microscopy apparatus as claimed in claim 1, wherein the first light source unit comprises:

a first part movable relative to the optical microscopy unit to vary a distance between a top surface of the sample holding unit and a bottom surface of the first light source unit; and a second part coupled to the first part, wherein the second part include at least a light source.

15. The compact portable multimodal microscopy apparatus as claimed in claim 14, wherein the second part is magnetically coupled with the first part.

16. The compact portable multimodal microscopy apparatus as claimed in claim 14, wherein the second part is foldable about the first part.

17. The compact portable multimodal microscopy apparatus as claimed in claim 1, wherein the first light source unit comprises:

a light directing element with a reflective top surface from outside;

a light emitting diode placed inside and proximal to the reflective top surface of the light directing element;

a diffuser coupled to a bottom surface of the light directing element; and a convex lens or a plano-convex lens placed in the diffuser, wherein the light emitting diode and the convex lens or the plano-convex lens are in-line with respect to each other in a manner that light rays emitted by the light emitting diode are directly directed towards the convex lens or the plano-convex lens and further onto the sample holding unit.

18. The compact portable multimodal microscopy apparatus as claimed in claim 17, wherein the first light source unit comprises:

at least one light emitting diode placed on a side surface of the light directing element, wherein peripheral surfaces of the at least one light emitting diode are made of an opaque material, and wherein light rays emitted by the at least one light emitting diode are reflected from the reflective top surface of the light directing element and diffused through the diffuser onto the convex lens or the plano-convex lens and further onto the sample holding unit.

19. The compact portable multimodal microscopy apparatus as claimed in claim 1, wherein the sample holding unit comprises a top cover to cover the at least one compartment.

20. The compact portable multimodal microscopy apparatus as claimed in claim 19, wherein the top cover is a wavelength-specific filter.

21. The compact portable multimodal microscopy apparatus as claimed in claim 1, wherein the compact portable multimodal microscopy apparatus comprises a first wavelength-specific filter disposed on a first planar side of the at least one compartment.

22. The compact portable multimodal microscopy apparatus as claimed in claim 21, wherein the compact portable multimodal microscopy apparatus comprises a second wavelength-specific filter disposed on a second planar side of the at least one compartment, wherein the second planar side is opposite to the first planar side.

23. The compact portable multimodal microscopy apparatus as claimed in claim 1, wherein the optical microscopy unit comprises a focusing platform corresponding to each of the one or more microscopy modules, wherein the focusing platform is movable to move the corresponding microscopy module within the optical microscopy unit for adjusting focus for imaging the sample in the sample holding unit.

24. The compact portable multimodal microscopy apparatus as claimed in claim 23, wherein the focusing platform comprises at least one of a solenoid-based arrangement, an electromagnetic arrangement, a piezoelectric movement-based arrangement, a motor-based arrangement, and a screw-based mechanism for the movement of the focusing platform.

25. The compact portable multimodal microscopy apparatus as claimed in claim 23, wherein the optical microscopy unit comprises a compressible spacer between the focusing platform and a top surface of the optical microscopy unit, wherein the compressible spacer is to control the movement of the focusing platform.

* * * * *